United States Patent [19]
Watanabe et al.

[11] Patent Number: 5,317,068
[45] Date of Patent: May 31, 1994

[54] COMPOSITION OF TETRAGLYCIDYL, TRIGLYCIDYL AND DIGLYCIDYL EPOXY RESINS

[75] Inventors: Osamu Watanabe; Shinichi Murakami, both of Saitama; Sadahisa Wada, Kamifukuoka; Hiroshi Inoue, Saitama, all of Japan

[73] Assignee: Tonen Corporation, Japan

[21] Appl. No.: 26,118

[22] Filed: Mar. 3, 1993

Related U.S. Application Data

[63] Continuation of Ser. No. 555,620, Jul. 23, 1990, abandoned.

[30] Foreign Application Priority Data

Jul. 31, 1989 [JP] Japan .................. 1-200099

[51] Int. Cl.$^5$ .............................................. C08L 63/02
[52] U.S. Cl. ................................ 525/526; 525/524; 525/527
[58] Field of Search .................. 525/524, 526, 527

[56] References Cited

U.S. PATENT DOCUMENTS

| | | | |
|---|---|---|---|
| 3,523,037 | 8/1970 | Chellis | 525/524 |
| 4,311,753 | 1/1982 | Pucci | 525/524 |
| 4,550,129 | 10/1985 | Nir et al. | 525/423 |
| 4,608,300 | 8/1986 | Gruber | 428/285 |
| 4,757,117 | 7/1988 | Moss | 525/524 |

FOREIGN PATENT DOCUMENTS

| | | |
|---|---|---|
| 2131929 | 6/1971 | Fed. Rep. of Germany . |
| 0133154 | 6/1983 | Fed. Rep. of Germany . |
| 59-217721 | 7/1984 | Japan . |
| 62-36421 | 2/1987 | Japan . |

OTHER PUBLICATIONS

Chemical Abstracts, vol. 102, No. 4, Jan. 28, 1985, Abstract No. 26033j.
Chemical Abstracts, vol. 84, No. 24, Jun. 14, 1976, Abstract No. 165619f.

*Primary Examiner*—Robert E. Sellers
*Attorney, Agent, or Firm*—Lorusso & Loud

[57] ABSTRACT

An epoxy resin composition useful as a matrix for fiber-reinforced composites is disclosed which includes a mixture containing 30-95% by weight of a tetrafunctional epoxy resin, 3-40% by weight of an admixture of trifunctional epoxy resin oligomers and 2-50% by weight of a bisphenol A epoxy resin having a number average molecular weight of 450-1,300 and such a weight average molecular weight as to provide a ratio of the weight average molecular weight to the number average molecular weight of 1.3-3.0.

7 Claims, No Drawings

COMPOSITION OF TETRAGLYCIDYL, TRIGLYCIDYL AND DIGLYCIDYL EPOXY RESINS

This application is a continuation of application Ser. No. 07/555,620, filed Jul. 23, 1990, now abandoned.

This invention relates generally to an epoxy resin composition and, more specifically, to a hardenable composition which is suitable as a matrix material for forming prepregs of reinforcing fibers having good tack and drape qualities and which affords composite articles or shaped articles having excellent modulus, toughness and resistance to heat and moisture absorption.

Because of their good resistance to heat and chemicals and good hardness and modulus, epoxy resins have been utilized for a wide variety of applications, for example, as a matrix material for carbon fibers, glass fibers, aramide fibers or the like reinforcing fibers in the fabrication of fiber-reinforced composite articles. Known epoxy resin compositions are, however, not fully satisfactory when utilized as a structure material for aircraft, which requires both high mechanical strengths inclusive of toughness and high resistance to heat and moisture absorption.

For instance, one known composition for forming composite materials for use in aircraft uses N,N,N',N'-tetraglycidyldiaminodiphenylmethane (hereinafter referred to as TGDDM for brevity) as an epoxy resin. TGDDM which is tetrafunctional can provide high cross-linking density, so that hardened bodies obtained from the known composition exhibits both high modulus and high heat resistance. However, the known composition has drawbacks because the resulting hardened bodies have poor elongation and are brittle.

For the purpose of improving the mechanical properties of hardened products of the above composition, it is proposed to use TGDDM in combination with triglycidyl-m-aminophenol (hereinafter referred to as TGMAP for brevity) which is a trifunctional epoxy resin (Japanese Published Unexamined Patent Applications Nos. 54-77699 and 55-86815). While the fiber-reinforced composite materials obtained by using this combination have improved heat resistance and modulus, they are low in toughness and in resistance to moisture absorption.

It is a general practice to use a liquid rubber for improving toughness of epoxy resins. However, this method cannot be applied to the epoxy resins of the above-mentioned type, because the resulting hardened products become poor in resistance to heat and moisture absorption and in modulus. Poor resistance to moisture absorption of hardened products such as composite articles causes reduction of the glass transition point, modulus and high temperature compression strength of the products.

Japanese Published Unexamined Patent Application No. 58-134126 discloses the incorporation of a thermoplastic resin such as polyethersulfone, polysulfone or polyacrylate in an epoxy resin composition for improving toughness of hardened products thereof. However, in order to improve the toughness, it is necessary to use the thermoplastic resin in a large amount. This causes increase in viscosity of the composition so that the moldability of the composition becomes poor and the tack of prepregs obtained using the composition become poor.

Japanese Published Unexamined Patent Application No. 59-217721 discloses a composition containing TGDDM, TGMAP, diaminodiphenylsulfone (hereinafter referred to as DDS for brevity) and an additional epoxy resin selected from a brominated epoxy resin and a novolac epoxy resin. Japanese Published Unexamined Patent Application No. 62-36421 discloses a composition containing TGDDM, TGMAP, DDS, a polyethersulfone and a bisphenol F epoxy resin. These known epoxy resin compositions are ill-suited for forming prepregs to be used for the production of fiber-reinforced composite materials, because the toughness, tack and drape qualities are not satisfactory.

It is essential that prepregs for structural applications have desirable tack and drape qualities. The tack qualities should be adequate to allow the prepregs to adhere to prepared molding surfaces or preceding plies for a lay-up, but light enough to part from the backing films without loss of resin. Drape is the measure of the formability of prepregs around contours such as a small-radius rod. The drapability should be good enough to allow the prepregs to be formed into complex shapes.

The present invention has been made with the above problem of conventional epoxy resin compositions. In accordance with the present invention there is provided a composition comprising a mixture of epoxy resins containing 30-95% by weight of a tetrafunctional epoxy resin, 3-40% by weight of a trifunctional epoxy resin and 2-50% by weight of a bisphenol A epoxy resin having a number average molecular weight of 450-1,300, said bisphenol A epoxy resin having such a weight average molecular weight as to provide a ratio of the weight average molecular weight to the number average molecular weight of 1.3-3.0.

The epoxy resin composition according to the present invention can afford a cured product having high modulus, hardness and toughness and excellent resistance to heat and chemicals. Fiber-reinforced plastics containing a matrix resin obtained from the epoxy resin composition of the present invention exhibit improved mechanical strengths such as impact strength, fracture strength, resistance to moisture absorption, resistance to thermal shock and adhesion. Further, the thermocurable resin composition is excellent in flowability and stability so that it is advantageously used for the formation of prepregs having excellent tack and drape qualities.

The present invention will now be described in detail below.

The composition according to the present invention contains as a main ingredient a mixture of a tetrafunctional epoxy resin (component (a)), a trifunctional epoxy resin (component (b)) and a specific bisphenol A epoxy resin (component (c)).

The tetrafunctional epoxy resin may be, for example, N,N,N',N'-tetraglycidyldiaminodiphenylmethane (TGDDM), tetraglycidyl-m-xylenediamine, tetraglycidylbis(aminomethylcyclohexane), tetraglycidylbenzophenone or bisresorcinol tetraglycidyl ether. TGDDM is commercially available under trade names of ARALDITE MY720 (Ciba-Geigy Inc.), ELM 434 (Sumitomo Chemical Industries, Ltd.), EPOTOTE YH434 (Toto Kasei K. K.) and EP604 (Yuka-Shell Epoxy Inc.).

The trifunctional epoxy resin may be, for example, N,N,O-triglycidyl-m-aminophenol (TGMAP), N,N,O-triglycidyl-p-aminophenol (TGPAP), fluoroglycinol triglycidyl ether, trihydroxybiphenyl triglycidyl ether or triglycidylaminophenol. TGMAP is commercially available under a trade name of ELM120 (Sumitomo Chemical Industries, Ltd.). TGPAP is also commercially available under trade names of ELM100 (Sumitomo Chemical Industries, Ltd.) and YX-4 (Yuka-Shell Epoxy Inc.).

The bisphenol A epoxy resin to be used in the composition according present invention is a mixture of oligomers with various different molecular weights having a number average molecular weight (Mn) of 450-1300, preferably 500-1,000. When the number average molecular weight of the bisphenol A epoxy resin is lower than 450, the toughness of hardened bodies obtained from the composition cannot be improved. Too high a number average molecular weight of the bisphenol A in excess of 1,300, on the other hand, causes reduction of tackiness and drape-formability of prepregs. The above-mentioned EPIKOTE resins have the following formula:

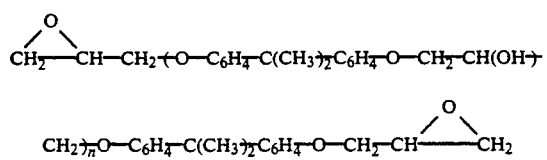

wherein n is a number providing a number average molecular weight of 380-5,500.

It is also important that the bisphenol A epoxy resin have such a weight average molecular weight (Mw) as to provide a ratio (Mw/Mn) of the weight average molecular weight to the number average molecular weight of 1.3-3.0. A ratio Mw/Mn of the bisphenol epoxy resin below 1.3 is insufficient to provide suitable toughness, while a ratio Mw/Mn greater than 3.0 causes reduction of tack and drape qualities of prepregs. Preferred ratio Mw/Mn is in the range of 1.5-2.7.

The bisphenol A epoxy resin to be used in the present invention can be suitably obtained by blending two or more commercially available, diglycidyl ethers of bisphenol A. Examples of suitable bisphenol A epoxy resins include Epikote 828, 1004, 1007, 1009 and 1010 (Trademarks of Yuka-Shell Epoxy Inc.) whose properties are shown below:

| Epikote | Epoxy Equivalent | Number Average Molecular Weight |
| --- | --- | --- |
| 828 | 184-194 | 380 |
| 1004 | 875-975 | 1600 |
| 1007 | 1750-2200 | 2900 |
| 1009 | 2400-3300 | 3750 |
| 1010 | 3000-5000 | 5500 |

In addition to the above-described tetrafunctional epoxy resin, trifunctional epoxy resin and bisphenol A epoxy resin, the mixture of epoxy resins may further contain an additional epoxy resin such as a phenol novolac epoxy resin or a cresol novolac epoxy resin, if desired.

The amounts of the tetrafunctional epoxy resin (component (a)), trifunctional epoxy resin (component (b)), bisphenol A epoxy resin (component (c)) and additional epoxy resin (optional component (d)) in the mixture are as follows (in terms of % by weight based on the total weight of the components (a)-(d)):

| Component | Amount (wt %) | Preferred Amount (wt %) |
| --- | --- | --- |
| (a) | 30-95 | 50-90 |
| (b) | 3-40 | 5-20 |
| (c) | 2-50 | 5-40 |
| (d) | up to 30 | |

An amount of the component (a) below 30% by weight is disadvantageous because the heat resistance and modulus of the hardened bodies obtained from the composition becomes poor. Too large an amount of the component (a) in excess of 95% by weight, on the other hand, is disadvantageous because the hardened bodies become brittle.

An amount of the component (b) below 3% by weight is disadvantageous because the tack of prepregs obtained from the composition becomes poor. Too large an amount of the component (b) in excess of 40% by weight, on the other hand, is disadvantageous because the hardened bodies become brittle.

An amount of the component (c) below 2% by weight is disadvantageous because the elongation and toughness of the hardened bodies obtained from the composition become poor. Too large an amount of the component (c) in excess of 50% by weight, on the other hand, is disadvantageous because the heat resistance and modulus of the hardened bodies become poor.

When the amount of the additional component (d) exceeds 30% by weight, the resistance to heat and moisture absorption and the toughness of composite materials obtained from the composition become poor and, additionally, the tack and drape qualities of prepregs become poor.

Any curing agent may be used in the present invention. The curing agent is generally used in a stoichiometrical amount with respect to the epoxy resin. Examples of the curing agents include:

(A) Amine curing agent:
(A-1) aliphatic primary amines such as diethylenetriamine, triethylenetetramine, tetraethylenepentamine, dipropylenetriamine, trimethylhexamethylenediamine, a polyether diamine, diethylaminopropylamine, menthendiamine, methaxylylenediamine and 3,9-bis(3-aminopropyl)-2,4,8,10-tetraspiro 5,5 undecane;

(A-2) aromatic primary amines such as methaphenylenediamine, diaminodiphenylmethane, diaminodiphenylsulfone, and aromatic diamine eutectic mixtures;

(A-3) modified amines such as amine adducts and cyanoethylated polyamines;

(A-4) secondary and tertiary amines such as tetramethylguanidiene, pyperidine, pyridine, picoline, benzyldimethylamine, 2-(dimethylaminomethyl)phenol; and (A-5) polyamides such as condensation products of a dimer acid with a polyamine;

(B) acid anhydrides:
(B-1) aromatic acid anhydrides such as phthalic anhydride, trimellitic anhydride, ethylene glycol bis(anhydrotrimellitate), glycerol tris(anhydrotrimellitate), pyromellitic anhydride and 3,3',4,4'-benzophenone tetracarboxylic anhydride;

(B-2) alicyclic acid anydrides such as maleic anhydride, succinic anhydride, tetrahydrophthalic anhydride, methyltetrahydrophthalic anhydride, methylnadic anhydride, alkenylsuccinic anhydride, hexahydrophthalic anhydride, methylhexahydrophthalic anhydride, and methylcyclohexene tetracarboxylic anhydride;
(B-3) aliphatic acid anhydrides, halogenated acid anhydrides, polycarboxylic anhydride and chloreside anhydride;
(C) polyamide resins such as N,N'-bis(6-aminohexyl)adipamide;
(D) imidazoles such as 2-methylimidazole, 2-ethyl-4-methylimidazole, 2-undecylimidazole, 2-heptadecylimidazole, 2-phenylimidazole, 1-benzyl-2-methylimidazole, 1-cyanoethyl-2-methylimidazole, 1-cyanoethyl-2-undecylimidazolium trimellitate, 2,4-diamino-6- 2-methylimidazolyl-(1) -ethyl-S-triazine, 1-dodecyl-2-methyl-3-benzylimidazolium chloride, 2-phenylimidazolium isocyanulate, and 2-phenyl-4-methyl-5-hydroxymethylimidazole;
(E) boron trifluoride-amine complexes;
(F) dicyanodiamide and its derivatives such as o-tolyl biguanide and -2,5-dimethylbiguanide;
(G) organic acid hydrazides such as succinic acid hydrazide and adipic acid hydrazide;
(H) diaminomaleonitrile and its derivatives;
(I) melamine and its derivatives such as diallylmelamine;
(J) amine imides;
(K) polyamines;
(L) oligomers such as novolac phenol resins, novolac cresol resins and poly-p-vinylphenols.

When the thermocurable epoxy resin composition of the present invention is to be used for the formation of molded articles such as mechanical parts, the use of diaminodiphenylmethane, diaminodiphenylsulfone and dicyanodiamide as the curing agent is preferred for reasons of obtainability of suitable toughness, heat resistance and machinability.

When the thermocurable epoxy resin composition is intended to be used for a carbon fiber-reinforced prepreg matrix, the use of dicyanodiamide, diaminodiphenylmethane and diaminodiphenylsulfone is also preferred for reasons of obtainability of suitable tack and drape qualities and of composite articles with excellent toughness, modulus and resistance to heat and moisture absorption.

The composition according to the present invention may contain one or more additives such as a filler and a diluent, if desired.

The curing of the epoxy resin composition of the present invention is generally performed at temperatures of 100°–140° C. for 1–3 hours. This may be followed, if desired, by a post curing treatment which may be performed at 150°–220° C. for 1–3 hours.

The epoxy resin composition according to the present invention is suitably used as a matrix resin for high performance composite materials, such as structural materials of, for example, cars, aircraft, spacecraft and watercraft which require high toughness, modulus and resistance to heat and moisture absorption. Since prepregs formed by the use of the epoxy resin composition have good tack and drape qualities, such composite materials may be prepared easily and with good workability. It is without saying that the epoxy resin composition of this invention may be used as other applications such as civil engineering and construction materials, coatings, lining materials, adhesives, molded materials and electrical appliances (for example, mechanical parts, jigs and tools).

The following examples will further illustrate the present invention.

EXAMPLE 1

TGDDM (Epikote 604, manufactured by Yuka-Shell Epoxy Inc.), TGPAP (ELM100, manufactured by Sumitomo Chemical Industries, Ltd.) a blend of bisphenol A epoxy resins were mixed with each other in amounts shown in Table 1 below. The formulation, the number average molecular weight (Mn) and ratio (Mw/Mn) of the weight average molecular weight (Mw) to the number average molecular weight of the bisphenol A epoxy resin blend are also shown in Table 1. The resulting epoxy resin mixture was heated to 150° C. to obtain a homogeneous mixture. After cooling to 90° C., the mixture was mixed with diaminodiphenylsulfone (DDS) in a stoichiometric amount, thereby to obtain a thermocurable composition. The composition was poured into a mold composed of two glass plates spaced apart from each other by a Teflon spacer, heated at 80° C. for 1 hour, and then at 200° C. for 2 hours in an oven, thereby to cure the resin. The cured product was sliced into test pieces with a size of 300 mm×300 mm×2 mm and the test pieces were subjected tested for Izod strength (IZOD) and glass transition temperature (Tg) to obtain the results summarized in Table 1. A prepreg was also prepared by impregnating carbon fibers (tensile strength: 350 kg/mm$^2$, modulus: 32 t/mm$^2$), arranged in parallel with each other, with the above epoxy resin composition. Workability for the fabrication of the prepreg was good because of low viscosity of the epoxy resin composition. The prepreg showed the tack (TAC) and the stability (STB) of the tack as shown in Table 1.

The tack was determined at 23° C. by touch with fingers and rated as follows:
A: excellent
B: not good
C: poor The stability of tack was tested by evaluating the tack at various temperatures in the range of 15°–30° C. and rated as follows:
good: No or almost no change in tackiness was observed.
poor: Significant change in tackiness was observed.

EXAMPLE 2

Example 1 was repeated in the same manner as described except the composition of the epoxy resin mixture was changed as shown in Table 1. The results were as summarized in Table 1.

COMPARATIVE EXAMPLES 1-8

Example 1 was repeated in the same manner as described except the composition of the epoxy resin mixture was changed as shown in Table 1. The results were as summarized in Table 1.

TABLE 1

| Example | Composition of Epoxy Resins (wt %) | | | Bisphenol A Epoxy Resin Composition (wt %) Epikote | | | | Mn | Mw/Mn | Izod (kg cm/ cm²) | Tg (°C.) | TAC | STB |
| --- | --- | --- | --- | --- | --- | --- | --- | --- | --- | --- | --- | --- | --- |
| | TGDDM | TGPAP | Bisphenol A | 828 | 1004 | 1007 | 1010 | | | | | | |
| 1 | 70 | 15 | 15 | 60 | 10 | 30 | | 573 | 2.2 | 5.2 | 227 | A | good |
| 2 | 80 | 5 | 15 | 60 | — | 40 | | 582 | 2.4 | 5.1 | 233 | A | good |
| Comp. 1 | 100 | — | — | — | — | — | | — | — | 2.1 | 242 | C | poor |
| Comp. 2 | 20 | 35 | 45 | 60 | — | 40 | | 582 | 2.4 | 5.3 | 195 | B | poor |
| Comp. 3 | 20 | 60 | 20 | 60 | 10 | 30 | | 573 | 2.2 | 3.5 | 215 | C | poor |
| Comp. 4 | 40 | 50 | 10 | 60 | 10 | 30 | | 573 | 2.2 | 3.2 | 232 | B | poor |
| Comp. 5 | 70 | — | 30 | 60 | 10 | 30 | | 573 | 2.2 | 5.8 | 225 | C | poor |
| Comp. 6 | 70 | 5 | 25 | 60 | 10 | — | 30 | 527 | 3.6 | 5.3 | 219 | B | poor |
| Comp. 7 | 70 | 5 | 25 | 100 | — | — | | 380 | 1.0 | 4.8 | 224 | C | poor |
| Comp. 8 | 30 | 10 | 60 | 60 | 10 | 30 | | 573 | 2.2 | 5.6 | 190 | B | poor |

What is claimed is:

1. An epoxy resin composition for forming fiber-reinforced composites having good tack and drape qualities, said composition consisting essentially of (A) 30–95% by weight of a tetrafunctional epoxy resin, (B) 3–40% by weight of a trifunctional epoxy resin, (C) 2–50% by weight of an admixture of epoxy resin oligomers, each of said oligomers being a polymer of a diglycidyl ether of bisphenol A having the following formula:

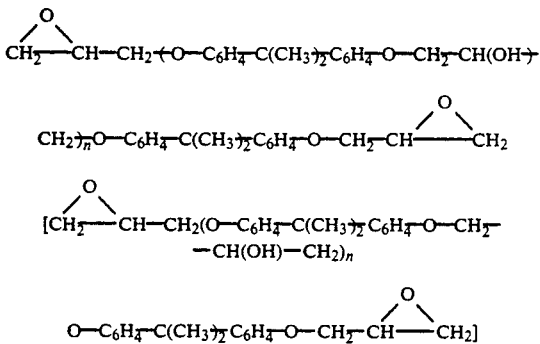

wherein n is a number providing a number average molecular weight of 380–5,500, said resin admixture (C) having a number average molecular weight of 450–1,300 and a weight average molecular weight providing a ratio of the weight average molecular weight to the number average molecular weight of 1.3–3.0 and (D) a curing agent.

2. A composition according to claim 1, wherein said tetrafunctional epoxy resin is N,N,N',N'-tetraglycidyl-diaminodiphenylmethane, tetraglycidyl-m-xylenediamine, tetraglycidylbis(aminomethylcyclohexane), tetraglycidylbenzophenone or bisresorcinol tetraglycidyl ether.

3. A composition according to claim 1, wherein said trifunctional epoxy resin is N,N,O-triglycidyl-m-aminophenol, N,N,O-triglycidyl-p-aminophenol, fluoroglycinol triglycidyl ether, trihydroxybiphenyl triglycidyl ether or triglycidylaminophenol.

4. A composition according to claim 1, wherein said admixture of epoxy resin oligomers has a number average molecular weight of 500–1,000.

5. A composition according to claim 1, wherein said admixture of epoxy resin oligomers has such a weight average molecular weight as to provide a ratio of the weight average molecular weight to the number average molecular weight of 1.5–2.7.

6. A composition according to claim 1, wherein the contents of the tetrafunctional epoxy resin, trifunctional epoxy resin and admixture of epoxy resin oligomers in said mixture are 50–90% by weight, 5–20% by weight and 5–40% by weight, respectively.

7. A composition according to claim 1, wherein said curing agent is dicyandiamide, diaminodiphenylmethane or diaminodiphenylsulfone.

* * * * *